United States Patent
Jones et al.

(10) Patent No.: US 11,047,712 B2
(45) Date of Patent: Jun. 29, 2021

(54) LIGHT PIPE FOR LOGGING-WHILE-DRILLING COMMUNICATIONS

(71) Applicant: HALLIBURTON ENERGY SERVICES, INC., Houston, TX (US)

(72) Inventors: Christopher Michael Jones, Katy, TX (US); Michel Joseph LeBlanc, Houston, TX (US); James M. Price, Cypress, TX (US); Jian Li, Houston, TX (US); Darren Gascooke, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/536,922

(22) Filed: Aug. 9, 2019

(65) Prior Publication Data
US 2021/0041271 A1 Feb. 11, 2021

(51) Int. Cl.
*G01D 5/26* (2006.01)
*G02B 6/44* (2006.01)
*E21B 17/10* (2006.01)
*E21B 47/135* (2012.01)
*E21B 49/00* (2006.01)

(52) U.S. Cl.
CPC ......... *G01D 5/268* (2013.01); *E21B 17/1007* (2013.01); *E21B 47/135* (2020.05); *G02B 6/443* (2013.01); *G02B 6/4479* (2013.01); *E21B 49/00* (2013.01)

(58) Field of Classification Search
CPC .............................. E21B 47/135; G01D 5/268
See application file for complete search history.

(56) References Cited

U.S. PATENT DOCUMENTS

| | | | | | |
|---|---|---|---|---|---|
| 4,130,343 | A | * | 12/1978 | Miller ....................... | G02B 6/30 385/49 |
| 4,855,718 | A | * | 8/1989 | Cholin .................... | G08B 17/12 340/578 |
| 4,913,505 | A | * | 4/1990 | Levy ....................... | G02B 6/032 264/1.24 |
| 4,930,863 | A | * | 6/1990 | Croitoriu ............... | G02B 6/032 385/125 |

(Continued)

OTHER PUBLICATIONS

Written Opinion, PCT application No. PCT/US2019/045953, dated May 7, 2020.

*Primary Examiner* — John Fitzgerald
(74) *Attorney, Agent, or Firm* — Polsinelli PC

(57) ABSTRACT

Technologies for propagating optical information through an optical waveguide in a downhole environment are provided. An example method can include generating a light signal via a light-emitting device at a first location on a wellbore environment; propagating the light signal through an optical waveguide on an inner surface of a wellbore tool, the optical waveguide including a first layer of low refractive-index material, a second layer of high refractive-index material applied to a first surface of the first layer, and a third layer of low refractive-index material applied to a second surface of the second layer; and receiving, by a detector at a second location on the wellbore environment, the light signal via the optical waveguide on the inner surface of the wellbore tool.

20 Claims, 8 Drawing Sheets

(56) References Cited

U.S. PATENT DOCUMENTS

| | | | | |
|---|---|---|---|---|
| 5,440,664 A * | 8/1995 | Harrington | | G02B 6/032 385/125 |
| 5,684,913 A * | 11/1997 | Sugiyama | | G02B 1/046 264/1.29 |
| 5,729,646 A * | 3/1998 | Miyagi | | A61B 18/201 385/125 |
| 5,995,696 A * | 11/1999 | Miyagi | | G02B 6/032 385/125 |
| 6,868,737 B2 * | 3/2005 | Croteau | | G01D 5/268 73/800 |
| 7,079,739 B1 * | 7/2006 | Vitruk | | G02B 6/032 385/123 |
| 7,277,162 B2 * | 10/2007 | Williams | | E21B 47/007 356/32 |
| 7,498,567 B2 * | 3/2009 | Brady | | E21B 47/135 250/256 |
| 7,664,356 B2 * | 2/2010 | Hongo | | G02B 6/032 385/125 |
| 7,969,571 B2 * | 6/2011 | DiFoggio | | G01N 21/552 356/326 |
| 8,096,354 B2 * | 1/2012 | Poitzsch | | E21B 47/135 166/250.01 |
| 8,720,040 B2 * | 5/2014 | Hongo | | G02B 6/032 29/592.1 |
| 9,625,638 B2 * | 4/2017 | Durkee | | G02B 6/0046 |
| 9,797,239 B2 * | 10/2017 | Godfrey | | E21B 47/10 |
| 10,408,725 B2 * | 9/2019 | Carter | | G01N 21/05 |
| 2005/0012036 A1 * | 1/2005 | Tubel | | E21B 41/0035 250/227.14 |
| 2008/0314138 A1 * | 12/2008 | Brady | | E21B 47/135 73/152.55 |
| 2009/0188665 A1 * | 7/2009 | Tubel | | E21B 47/07 166/250.01 |
| 2009/0250241 A1 * | 10/2009 | Galletti | | H01B 3/47 174/110 SR |
| 2012/0170023 A1 | 7/2012 | Szobota et al. | | |
| 2012/0315005 A1 * | 12/2012 | Hu | | G02B 6/36 385/114 |
| 2014/0270672 A1 * | 9/2014 | Durkee | | G02B 6/0028 385/131 |
| 2015/0013446 A1 * | 1/2015 | Godfrey | | E21B 47/135 73/152.32 |
| 2015/0125117 A1 * | 5/2015 | Stoesz | | G02B 6/3636 385/51 |
| 2016/0231460 A1 * | 8/2016 | Pearl, Jr. | | G02B 6/10 |
| 2017/0260848 A1 * | 9/2017 | Xia | | E21B 47/107 |
| 2018/0024001 A1 | 1/2018 | Brueck et al. | | |
| 2020/0011169 A1 * | 1/2020 | Haghshenas | | E21B 47/10 |

* cited by examiner

LIGHT PIPE FOR LOGGING-WHILE-DRILLING COMMUNICATIONS

TECHNICAL FIELD

The present technology generally pertains to data communications between the surface of a well and a downhole tool.

BACKGROUND

Logging while drilling (LWD) is a technique used in the oil and gas industry to measure formation properties during, or shortly after, drilling operations. Typically, logging tools are integrated into the bottomhole assembly (BHA) of a well and used to capture and transmit measurements to the surface for further evaluation. The measurements can provide useful well information such as, for example, formation pressure, porosity, rate of penetration, and resistivity. The measurements can also help drillers and engineers predict drilling hazards and guide the well placement to ensure the wellbore remains within a zone of interest.

LWD measurements and data can be transmitted to the surface using, for example, mud-pulse telemetry, electromagnetic telemetry, or wired links. However, the current telemetry systems used to communicate information to or from the surface can be slow and prone to interference caused by the harsh conditions downhole. Moreover, current telemetry systems can often interrupt well operations by occupying the fluid medium within the tubing, restricting pumping configurations, and so forth. These and other limitations can negatively impact data communications in a well system as well as well operations that rely or benefit from such data.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
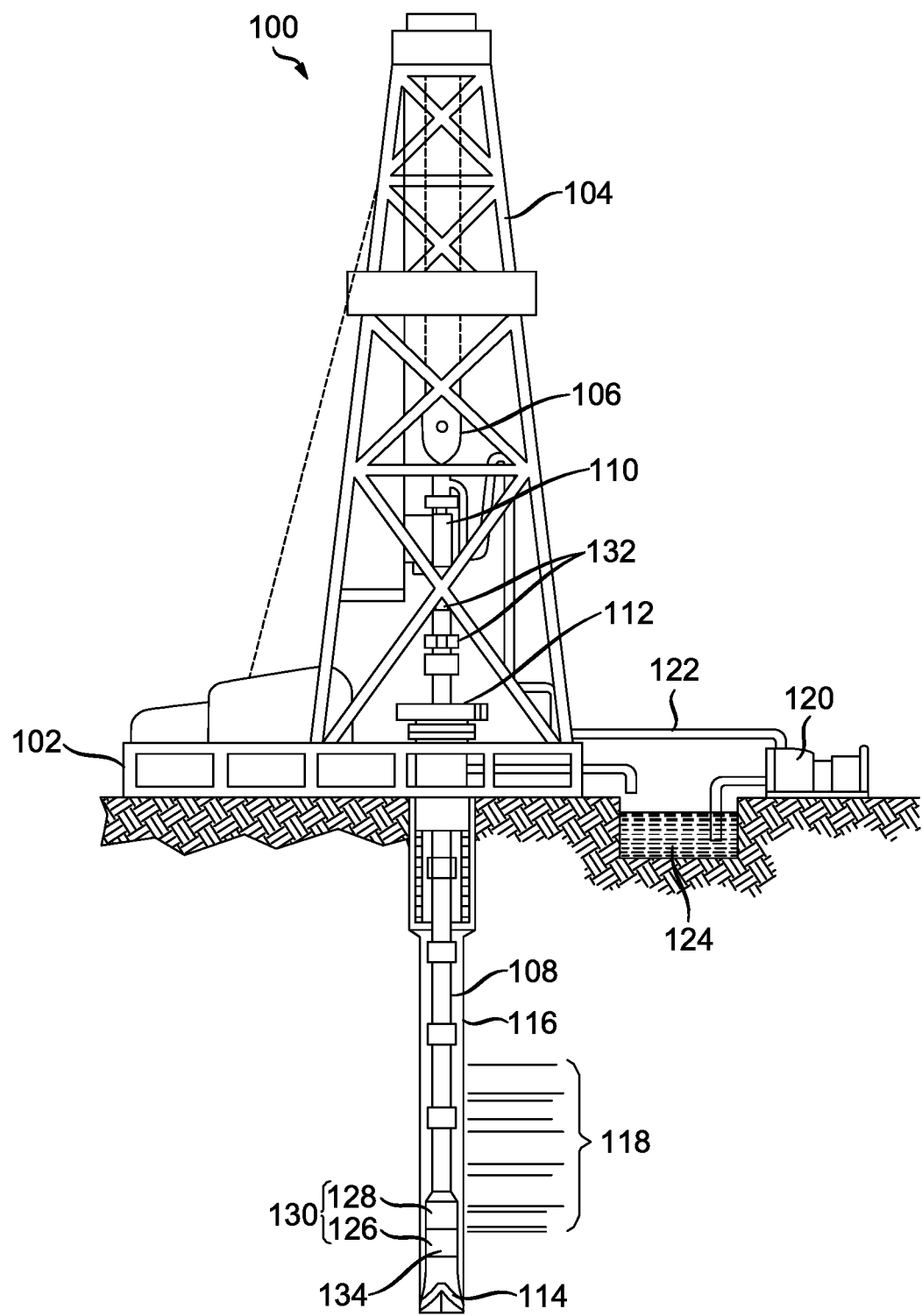
FIG. 1 is a schematic diagram of an example logging while drilling (LWD) wellbore operating environment, in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The technologies herein can provide a light pipe for transmitting information in a downhole environment. The light pipe can be an optical waveguide for carrying optical data signals (light) between a surface of a wellbore and a downhole location of the wellbore. In some implementations, the optical waveguide can be formed using the inner surface of a drill pipe in the wellbore. For example, the inner surface of a drill pipe can be coated with a series of transparent low and high refractive-index materials for a given wavelength. The high-refractive index material can be surrounded by adjacent coats of low-refractive index material that act as a buffer to trap light within the high-refractive index. This way, the high-refractive index material can provide a medium (e.g., the optical waveguide) for carrying the optical data signals through total internal reflection. The high-refractive index material can propagate light without (or with limited) loss or transmission through the boundary.

To communicate information through the optical waveguide, a light source can inject light into the optical waveguide at a given wavelength and angle of incidence. For total internal reflection, the incident angle $\theta_i$ can be greater than or equal to the critical angle $\theta_c$. The light source can be, for example and without limitation, a laser, a light-emitting diode (LED), a light bulb, and the like. One or more light sources and detectors (e.g., receivers) can be located on the surface of the wellbore and/or downhole. In some cases, different frequencies of light can be used for different channels of communication. For example, different frequencies of light can be used for downhole communications and uphole communications.

The high and/or low refractive-index materials can be deposited in the inner surface of the drill pipe using, for example, plasma enhanced chemical vapor deposition (PECVD). In some cases, the low refractive-index materials, or any other binary compound, can also be deposited using plasma-enhanced atomic layer deposition (ALD). The plasma process can provide sufficient kinetic energy to achieve a chemical reaction at the surface within the drill pipe. Such deposition techniques can allow for a uniform, conformal coverage for coating the internal surface of the drill pipe. In some cases, the high and/or low refractive-index materials can be deposited using other deposition processes that rely on heating and thermal methods to provide sufficient kinetic energy for the chemical reaction.

According to at least one example, a method for communicating data through a light pipe in a downhole environment is provided. The method can include generating a light signal via a light-emitting device at a first location on a wellbore environment; propagating the light signal through an optical waveguide on an inner surface of a wellbore tool, the optical waveguide including a first layer of low refractive-index material, a second layer of high refractive-index material applied to a first surface of the first layer, and a third layer of low refractive-index material applied to a second surface of the second layer; and receiving, by a detector at a second location on the wellbore environment, the light signal via the optical waveguide on the inner surface of the wellbore tool.

According to another example, a system for communicating data through a light pipe in a downhole environment is provided. The system can include a wellbore tool and an optical waveguide on an inner surface of the wellbore tool, the optical waveguide including a first layer of low refractive-index material on the inner surface of the wellbore tool, a second layer of high refractive-index material applied to a first surface of the first layer, and a third layer of low refractive-index material applied to a second surface of the second layer.

In some aspects, the first location referenced in the example system and method described above can include a surface location or a downhole location, and the second location can include a different one of the surface location or the downhole location. Moreover, the wellbore tool can include, for example, a drill pipe, a wellbore tubular, a production tubing, and/or a wellbore component.

In some implementations, the optical waveguide further include a protective layer of scratch resisting material coating on the inner surface of the wellbore tool and/or an outer surface of the third layer. The scratch resisting material can include, for example, diamond, diamond-like carbon, sapphire, or any other scratch resisting material. In some implementations, the optical waveguide can include a buffer layer of a buffering material applied directly on the inner surface of the wellbore tool. In such implementations, the first layer of the optical waveguide can be applied to, or coated over, the buffer layer.

In some aspects, the first layer, the second layer, and/or the third layer on the inner surface of the wellbore tool can be deposited and/or chemically bonded using plasma-enhanced chemical vapor deposition or plasma-enhanced atomic layer deposition. Moreover, in some examples, the low refractive-index material on the first and/or third layer can include silicon dioxide, sapphire crystal, fused silica, or any other low refractive-index dielectric oxide film, and the high refractive-index material on the second layer can include silicon, germanium, gallium arsenide, or a high refractive-index semiconductor compound material.

In some aspects, the example system and method described above can include generating a second light signal via a second light-emitting device at the second location on the wellbore environment; propagating the second light signal through the optical waveguide on the inner surface of the wellbore tool; and receiving, by a second detector at the first location on the wellbore environment, the second light signal via the optical waveguide on the inner surface of the wellbore tool. In some implementations, the first light signal and the second light signal can be propagated through the optical waveguide via different frequency or wavelength channels and isolated using one or more filters such as, for example, a narrow band filter or bandpass filter.

In some aspects, the example system and method described above can include generating a second light signal via a second light-emitting device at the second location on the wellbore environment; propagating the second light signal through a second optical waveguide on the inner surface of the wellbore tool; and receiving, by a second detector at the first location on the wellbore environment, the second light signal via the optical waveguide on the inner surface of the wellbore tool. The second optical waveguide can include a fourth layer of high refractive-index material over the third layer of low refractive-index material and a fifth layer of low refractive-index material applied over the fourth layer.

Figure 6:
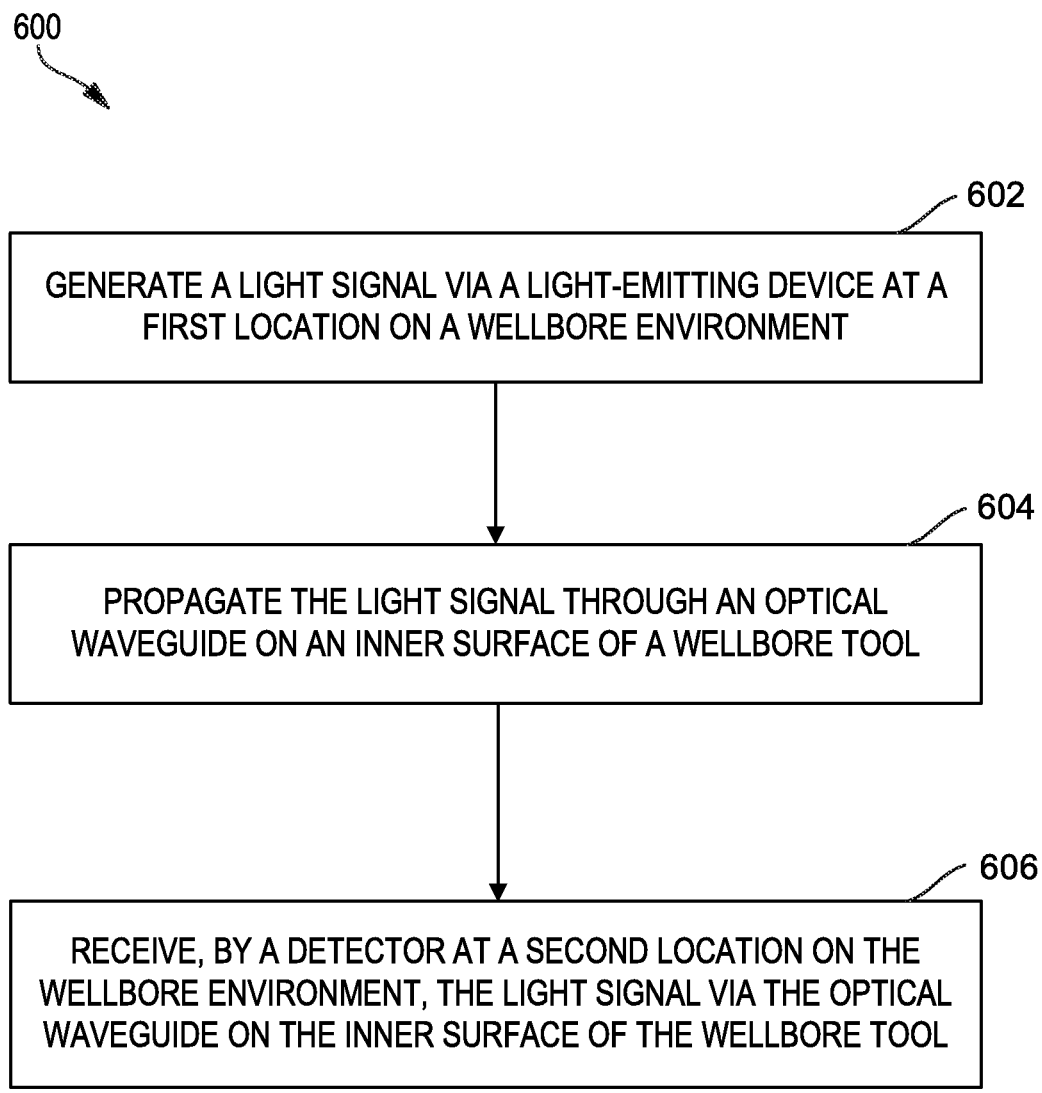
FIG. 6 is a flowchart of an example method for implementing an optical waveguide to communicate information to and from a downhole location on a wellbore, in accordance with some examples.
Figure 7:
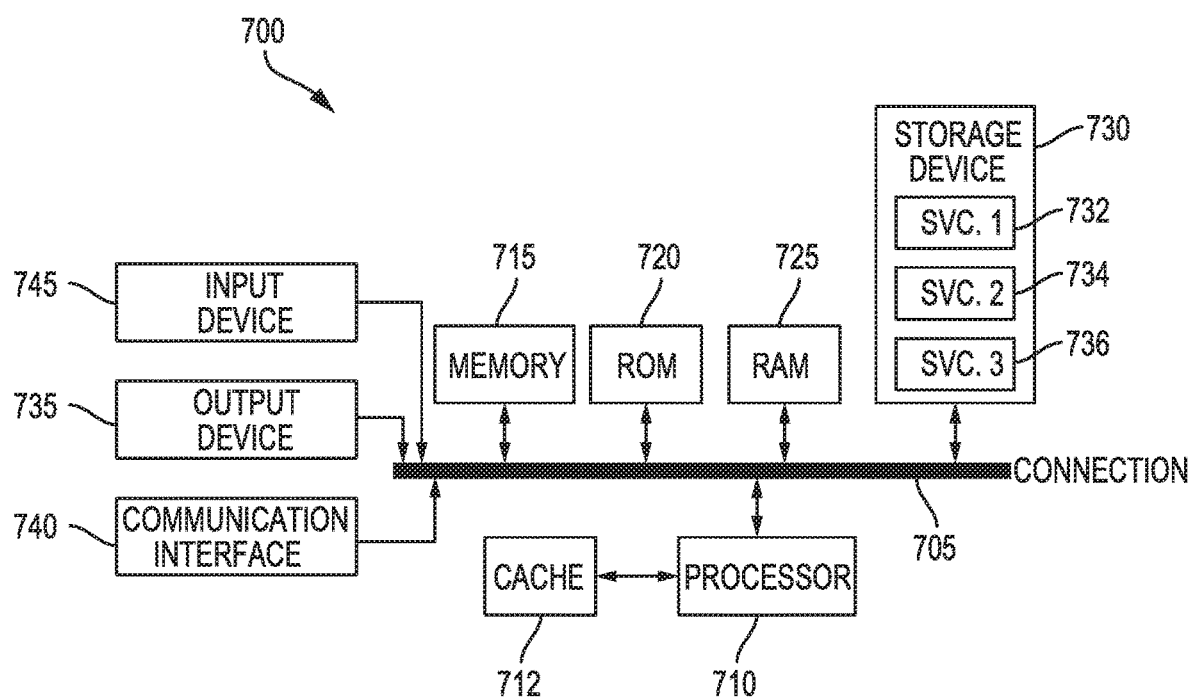
FIG. 7 is a schematic diagram of an example computing device architecture, in accordance with some examples.

As follows, the disclosure will begin with a description of example systems, environments and techniques for communicating data through a light pipe, as illustrated in FIGS. 1 through 5. A description of an example methods for communicating data through a light pipe in a downhole environment, as shown in FIG. 6, will then follow. The disclosure concludes with a description of an example computing system architecture, as shown in FIG. 7, which can be implemented for performing computing operations and functions as disclosed herein. These variations shall be described herein as the various embodiments are set forth. The disclosure now turns to FIG. 1.

FIG. 1 illustrates a schematic view of a logging while drilling (LWD) wellbore operating environment 100 in in accordance with some examples of the present disclosure. As depicted in FIG. 1, a drilling platform 102 can be equipped with a derrick 104 that supports a hoist 106 for raising and lowering a drill string including a drill pipe 108. The hoist 106 suspends a top drive 110 suitable for rotating and lowering the drill pipe 108 through a well head 112. A drill bit 114 can be connected to the lower end of the drill pipe 108. As the drill bit 114 rotates, the drill bit 114 creates a wellbore 116 that passes through various formations 118. A pump 120 can circulate drilling fluid through a supply pipe 122 to the top drive 110, down through the interior of the drill pipe 108 and orifices in the drill bit 114, back to the surface via the annulus around the drill pipe 108, and into a retention pit 124. The drilling fluid transports cuttings from the wellbore 116 into the retention pit 124 and aids in maintaining the integrity of the wellbore 116. Various materials can be used for drilling fluid, including oil-based fluids and water-based fluids.

Logging tools 126 can be integrated into a bottom-hole assembly 130 near the drill bit 114. As the drill bit 114 extends the wellbore 116 through the formations 118, logging tools 126 collect measurements relating to various formation properties as well as the orientation of the tool and various other drilling conditions. The bottom-hole assembly 130 can also include a telemetry sub 128 to transfer measurement data to a surface communication device 132 and to receive commands from the surface. In some cases, the telemetry sub 128 can communicate with the surface communication device 132 using mud pulse telemetry. In some instances, the telemetry sub 128 does not communicate with the surface, but rather stores logging data for later retrieval at the surface when the logging assembly is recovered.

The logging tools 126 can include one or more tool components spaced apart from each other and communicatively coupled with one or more wires and/or other media. The logging tools 126 may also include one or more computing devices 134 communicatively coupled with one or more of the one or more tool components by one or more wires and/or other media. The one or more computing devices 134 may be configured to control or monitor a performance of the tool, process logging data, and/or carry out one or more aspects of the methods and processes of the present disclosure.

In some cases, one or more of the logging tools 126 may communicate with the surface communication device 132 by a wire. Moreover, in some cases, one or more of the logging tools 126 may receive electrical power from a wire that extends to the surface, including wires extending through the drill pipe 108. In at least some instances, one or more of the logging tools 126 can communicate with the surface communication device 132 by wireless signal transmission. For example, the one or more logging tools 126 can include a light-emitting device, such as a laser, LED, light bulb, optical sensor system, etc., for communicating optical data signals to the surface communication device 132 using an inner surface of the drill pipe 108 as a waveguide (e.g., light pipe) for carrying the optical data signals.

In some cases, the logging tools 126 can include an optical sensor system that can transmit optical data signals (light) to a surface communication device 132 and receive optical data signals from a surface location (e.g., surface communication device 132). The optical sensor system can include a light source, a light detector, and/or one or more data processing components. The optical data signals can be communicated between the optical sensor system and the surface location (e.g., the surface communication device 132) using the inner surface of the drill pipe 108 as a waveguide, as further described herein.

Figure 2A:
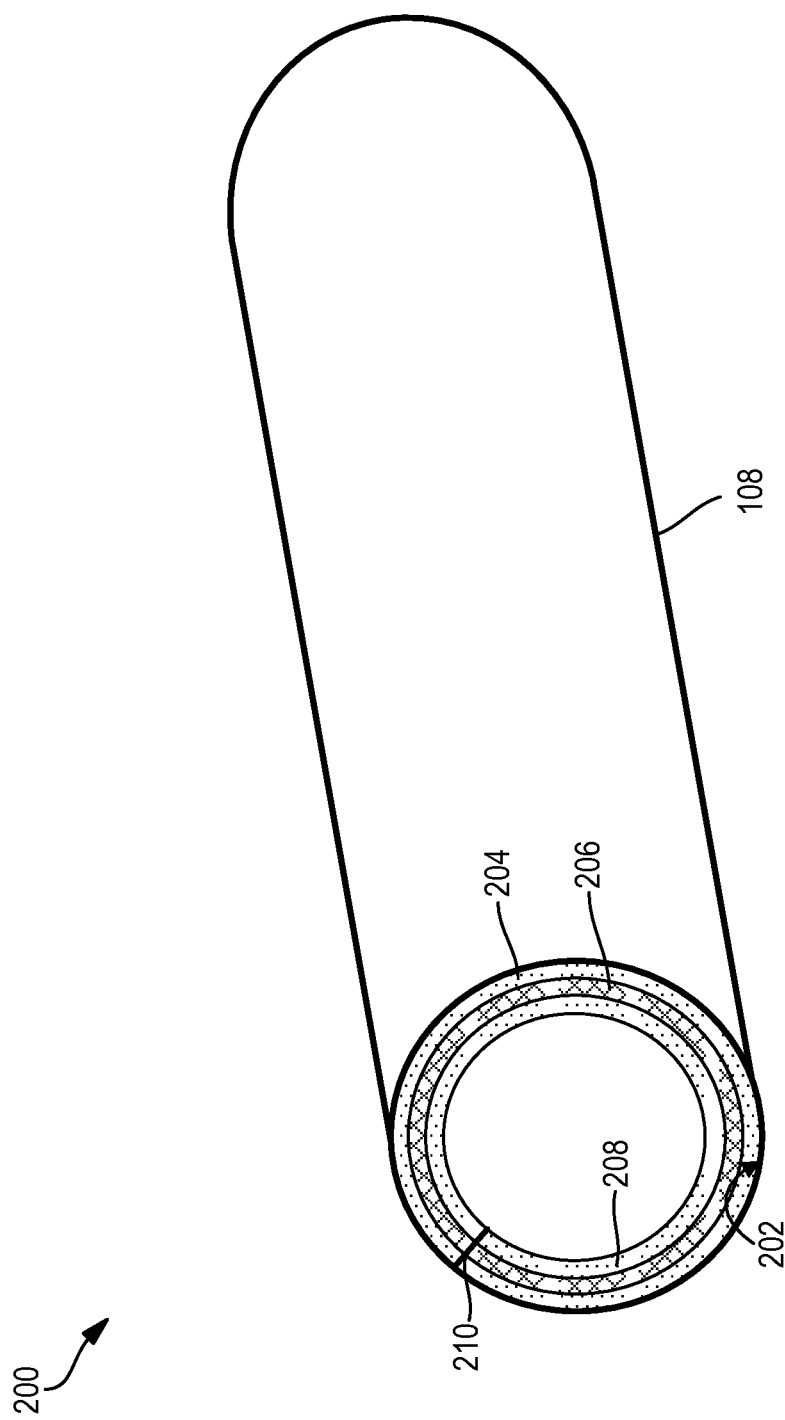
FIG. 2A is a diagram of an example configuration of an optical waveguide formed using an inner surface of a drill pipe in a wellbore environment, in accordance with some examples.

Having disclosed an example drilling environment, the disclosure now turns to FIG. 2A, which illustrates an example configuration 200 of an optical waveguide formed using an inner surface 202 of the drill pipe 108 in a wellbore environment (e.g., 100). The optical waveguide can include a sequence of layers 204-208 (or films) of low and high refractive index materials deposited within the inner surface 202 of the drill pipe 108.

In this example, the inner surface 202 of the drill pipe 108 is first coated with a low index layer 204 of low-refractive index material. The low-refractive index material used to create the low index layer 204 can be any coating or film that has a lower refractive index than the propagation medium, which in this example is a high index layer 206 adjacent to the low index layer 204. Non-limiting examples of low-refractive index material that can be used for the low index layer 204 include silicon dioxide (SiO2), sapphire crystal (Ai2O3), fused silica, or any other low index dielectric oxide film. In one illustrative example, for incident light with a wavelength of 1.5 microns, the refractive index of SiO2 can be approximately 1.45 and the refractive index for Ai2O3 can be approximately 1.65. These example values are specific to the deposition process used and may change for different processes and deposition conditions.

The low index layer 204 can be made sufficiently thick to support a high-refractive index material used for the high index layer 206, without any (or with limited) stress due to lattice mismatching with the drill pipe 108. In some examples, a thin film with a thickness of several (e.g., 1-5) microns may can be used for the low index layer 204. In other examples, a thicker film can be used to decouple potential energy loss through evanescent waves.

The low index layer 204 is then coated with a high index layer 206 of high-refractive index material. As previously noted, the high-refractive index material has a higher refractive index than the low-refractive index material used in the low index layer 204. Non-limiting examples of high-refractive index material that can be used for the high index layer 208 include silicon (Si), germanium (Ge), titanium dioxide (TiO2), gallium arsenide (GaAs), or any other high index semiconductor materials including any semiconductor materials with refractive indices greater than ~2 and negligible absorption (e.g., extinction coefficient) over the wavelength of interest. For Si, the refractive index and extinction coefficient (for a given wavelength=1500 nm) are 3.485 and 0, respectively. Enhanced transmission percentages can be achieved by minimizing absorption and scattering losses in the high-refractive index material.

The high index layer 206 can serve as a propagation medium or waveguide for light. For example, the high index layer 206 can carry light transmitted from one end of the drill pipe 108 (e.g., at or near the surface of the wellbore) to the other end of the drill pipe 108 (e.g., downhole), and vice versa. The light transmitted through the high index layer 206 can carry data and enables high-speed communications.

The high index layer 206 is then coated with a second low index layer 208 of low-refractive index material. The low-refractive index material in the second low index layer 208 can include a material having a lower index of refraction than the high-refractive index material in the high index layer 206, such as SiO2, Ai2O3, fused silica, or any other low index dielectric oxide film. With the low index layers 204 and 208 applied on both sides or surfaces of the high index layer 206, the high-refractive index material in the high index layer 206 is buffered by a low-refractive index material on each surface. The high index layer 206 can thus become an optical waveguide or propagation medium by total internal reflection of light transmitted at an angle of incidence that is greater or equal to the critical angle: $\Theta = \text{ArcSin}(n_L/n_H)$.

In FIG. 2A, the entire inner surface 202 is coated with the layers 204-208. This can allow the entire inner surface 202 of the drill pipe to be used as a waveguide, and can provide better coupling across any joints between different drill pipes or components. This can also provide resistance to scratches or other damage to the inside of the drill pipe 108, and can limit or reduce any signal interruption or loss due to scratches or damage in a particular area inside the drill pipe 108.

For example, FIG. 2A shows a scratch 210 across the layers 204-208 at a particular area within the inner surface 202 of the drill pipe 108. The scratch 210 can cause interruption or loss of signals traveling through the waveguide along the path of the scratch 210. Since the entire inner surface 202 of the drill pipe 108 is coated with the layers 204-208 that form the waveguide, the remaining, unscratched surface area in the inner surface 202 of the drill pipe 108 can continue to carry signals without being impacted by the scratch 210. Thus, in this example where the entire inner surface 202 is coated with the layers 204-208, the negative impact on signals carried through the waveguide is significantly reduced, as only a smaller subset of signals that encounter the scratch 210 will be affected by the scratch, and the waveguide can continue carrying signals despite the scratch 210.

In some implementations, the layers 204-208 can be applied across multiple pipes to extend the waveguide across the multiple pipes. In some cases, the high refractive-index material can extend to the coupling surface between two pipes (e.g., drill pipe 108 and another drill pipe) to account for any mismatch between the interior surfaces of the two pipes. In some cases, the coupling surface between the two pipes can be shaped in a mating beveled surface to increase the coupling. Moreover, a high index of refraction jointing material such as silicone can be used to increase the coupling between the two surfaces of two pipes in order to increase transmission probabilities and reduce potential transmission loss. For example, in cases where multiple tool strings or pipes are joined together, the joints can be coated with an index-matching layer or gel to minimize optical transmission loss through the high refractive-index material.

In some cases, the deposition of high refractive-index and/or low refractive-index materials used to create the layers 204-208 can be performed using plasma enhanced chemical vapor deposition (PECVD). PECVD can allow for a fast deposition rate cycle and can accommodate the deposition of single compound semiconductor films (e.g., Si, Ge, etc.) as well as scratch or abrasive resistant films such as diamond or diamond-like carbide (DLC). For low refractive-index materials (and/or any other binary compound), a plasma-enhanced atomic layer deposition (ALD) process can also be used.

The plasma process can provide sufficient kinetic energy to achieve the chemical reaction at the surface within the drill pipe 108. Other deposition processes can also be used. For example, other deposition processes that rely on heating and thermal methods to provide sufficient kinetic energy can be used. The various deposition techniques described herein can allow for the uniform, conformal coverage to coat the internal surface 202 of the drill pipe 108.

In some cases, communication channels used to transmit light within the inner surface 202 of the drill pipe 108 can be optimized by adding layers of frequency. For example, light color frequencies can be varied to determine a best data rate and/or a lowest bit error rate for light signals. Moreover, in some implementations, a waveguide formed from a sequence of low-high-low index layers can be deposited in one or more locations on the drill pipe 108 to carry light between an interior of the drill pipe 108 and an exterior of the drill pipe 108.

For example, a waveguide can be deposited to run between an interior and an exterior of the drill pipe 108 (or other vessel) using a Mobius strip, which has only one side/surface and only one boundary. The Mobius strip can combine low-high-low index layers to form a waveguide as described herein. The Mobius strip can thus carry light signals between an interior and exterior of the drill pipe 108.

Figure 2B:
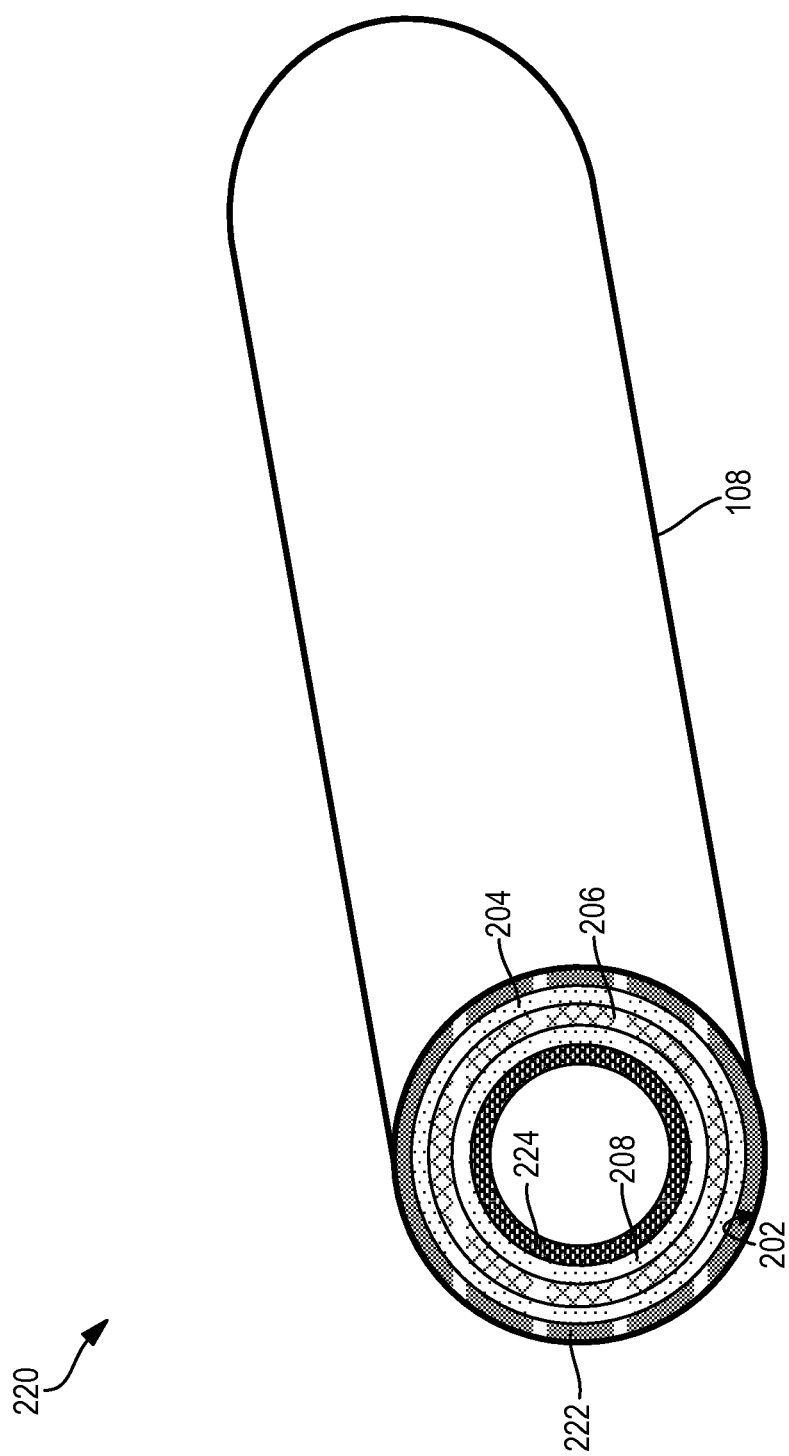
FIG. 2B illustrates another example configuration of an optical waveguide formed using an inner surface of a drill pipe in a wellbore environment, in accordance with some examples.

FIG. 2B illustrates another example configuration 220 of an optical waveguide formed using the inner surface 202 of the drill pipe 108. In this example, before depositing the layers 204-208 on the inner surface 202 of the drill pipe 108, a buffer layer 222 can be optionally deposited on the inner surface 202 of the drill pipe 108. The buffer layer 222 can provide a buffer for the other layers 204-208 to help protect the other layers 204-208 from damage, abrasion, etc., and/or facilitate the deposition or adherence of the other layers 204-208 on the inner surface 202 of the drill pipe 108.

Once the inner surface 202 of the drill pipe 108 is coated with the buffer layer 222, the low index layer 204 can be applied over (e.g., on the surface), or adjacent to, the buffer layer 222, and the remaining layers (206 and 208) can be applied as previously described. In addition, a protective layer 224 can be applied over the surface of the second low index layer 208. The protective layer 224 can coat the second low index layer 208 with a scratch or abrasive resistant barrier to protect the entire waveguide configuration (e.g., layers 204-208) from potential damage. In some examples, the protective layer 224 can include a film or coat of diamond or diamond-like carbon (DLC).

In one example implementation, the layers 204, 206, 208, and 224 can include a first film of sapphire on the drill pipe 108 (layer 204) followed by a film of silicon (layer 206), then followed by another film of sapphire (layer 208), which is then followed by a film of a diamond-like material (layer 224). The films in this example can provide durability and an adequate sequence of low, high, low refractive-index materials for light propagation by total internal reflection. In another example implementation, the sequence of layers 204, 206, 208, and 224 can include a first film of sapphire on the drill pipe 108 (layer 204) followed by a film of titanium dioxide (layer 206), followed by another film of sapphire (layer 208), and followed by a film of diamond or a diamond-like material (layer 224).

While FIGS. 2A and 2B are shown with a specific sequence of a high index layer (206) between two low index layers (204 and 208), it should be noted that this sequence is merely an illustrative example provided for explanation purposes and other configurations are also contemplated herein. For example, in some implementations, the inner surface 202 of the drill pipe 108 can be coated with multiple sequences of low-high-low index layers. In some cases, each sequence of low-high-low index layers can serve as a different optical waveguide or communication channel. To illustrate, a first sequence of low-high-low index layers can be used to form a waveguide for optical data signals transmitted from a surface location of a wellbore to a downhole location, and a second sequence of low-high-low index layers can be used to form another waveguide for optical data signals transmitted from a downhole location to a surface location of the wellbore.

Moreover, while the layers 204-208 in FIG. 2A and the layers 204, 206, 208, 222, 224 in FIG. 2B are shown coating the entire inner surface 202 of the drill pipe 108, it should be noted that this is merely one example implementation provided for explanation purposes and other configurations are also contemplated herein. For example, in some cases, the layers 204-208 can instead be applied (with or without layers 222 and 224) to a subset of the inner surface 202 of the drill pipe 108 along a length of the drill pipe 108. To illustrate, a channel or waveguide can be created from the inner surface 202 of the drill pipe 108 by applying the layers 204-208 to a portion of the inner surface 202 of the drill pipe 108 along the length of the drill pipe 108. Additional channels or waveguides can also be similarly created from the inner surface 202 of the drill pipe 108 by applying the layers 204-208 to other portions of the inner surface 202 of the drill pipe 108.

Figure 3:
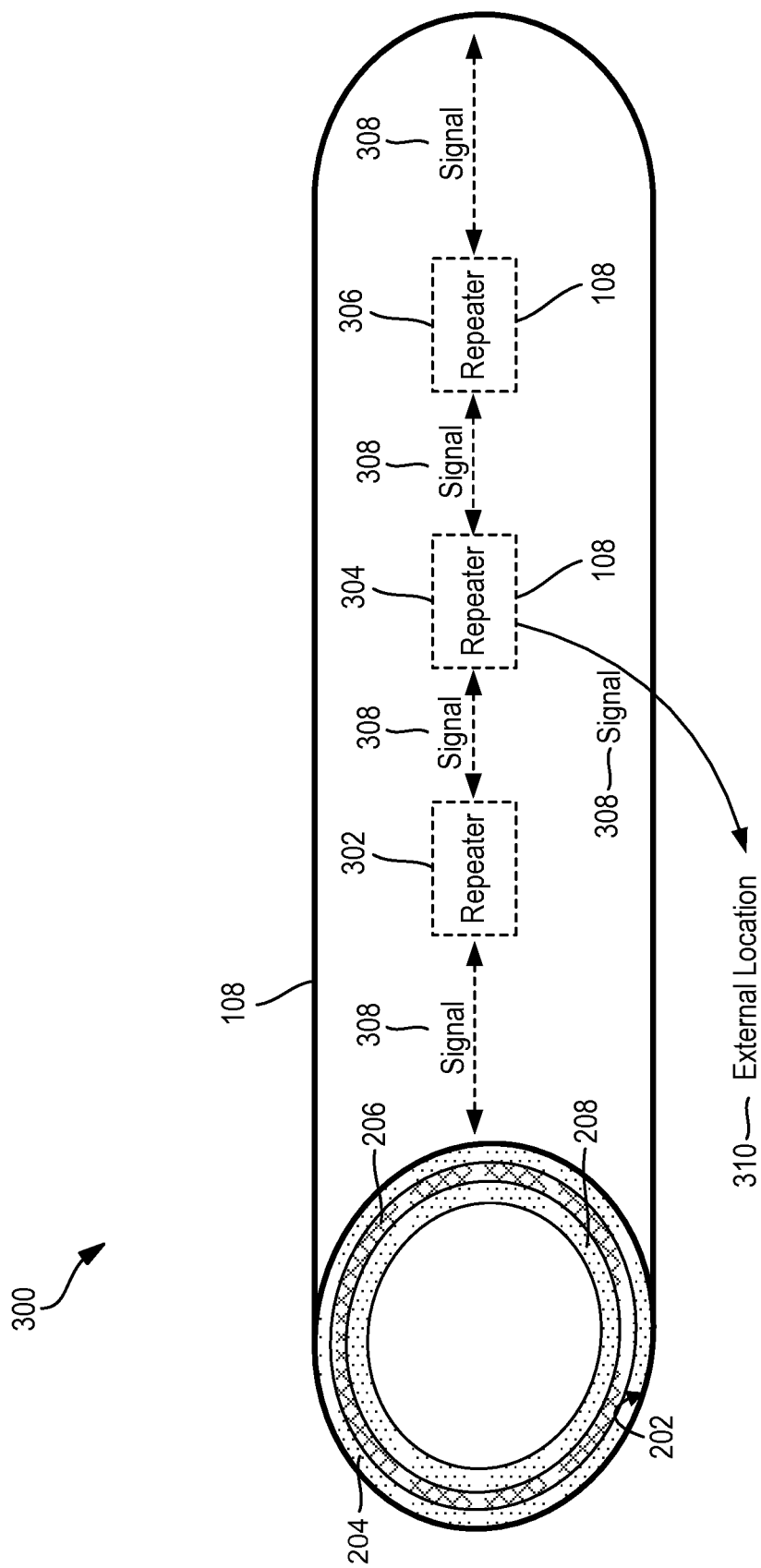
FIG. 3 is a diagram of an example optical waveguide configuration including repeaters installed along a drill pipe to boost signals carried by the optical waveguide on the inner surface of the drill pipe, in accordance with some examples.

FIG. 3 illustrates an example optical waveguide configuration 300 including repeaters 302, 304, and 306 installed along the drill pipe 108 to boost signals carried by the optical waveguide on the inner surface 202 of the drill pipe 108. In some cases, the repeaters 302, 304, and 306 can be battery-powered repeaters or relays configured to boost and retransmit signals carried by the optical waveguide. The repeaters 302, 304, and 306 can not only remove unwanted noise from the signals and/or reduce or eliminate attenuation of the signals, but can also allow lower-power light sources such as LEDs to be used to transmit the signals along the waveguide and between a surface location and a downhole location.

The repeaters 302, 304 and 306 can be installed at different locations within the drill pipe 108. In some examples, the repeaters 302, 304 and 306 can be installed or inserted on the drill pipe 108 at fixed distances to boost a signal 308 as it travels through the waveguide (e.g., layers 204-208) on the inner surface 202 of the drill pipe 108. Moreover, in some cases, the repeaters 302, 304, and 306 can be installed or deposited within or into the layers 204-208 along different locations within the drill pipe 108. In some examples, the number of repeaters implemented can be varied as needed based on one or more factors such as, for example, the type of light source used to transmit the signals, the distance between the signal origin and destination, conditions within the drill pipe 108, the conditions in the wellbore, etc.

As the repeaters 302, 304 and 306 receive a signal 308, the repeaters 302, 304 and 306 can regenerate and amplify the signal 308 to remove unwanted noise and reduce or overcome any attenuation of the signal 308. The repeaters 302, 304 and 306 can then propagate the amplified signal along the waveguide toward the signal's destination. For example, repeater 302 can receive the signal 308 carried by the waveguide (e.g., layers 204-208) on the drill pipe 108, regenerate and amplify the signal 308, and re-transmit the signal 308 along the waveguide. The next repeater 304 can receive the signal 308 transmitted by repeater 302 and similarly regenerate and amplify the signal 308, and re-transmit the signal 308 along the waveguide. Repeater 306 can receive the signal 308 transmitted by repeater 304 and again regenerate and amplify the signal 308, and re-transmit the signal 308 along the waveguide.

In some implementations, one or more of the repeaters 302, 304, and 306 can be used to relay or propagate signals outside of the drill pipe 108. For example, repeater 304 can relay signal 308 to an external location 310 (e.g., a location outside of the drill pipe 108). The repeater 304 can relay the signal 308 to the external location 310 in lieu of, or in addition to, relaying or retransmitting the signal 308 along the waveguide inside of the drill pipe 108. Moreover, in some cases, the repeater 304 can convert the signal 308 into another form and transmit the converted signal to the external location 310. For example, the repeater 304 can convert the signal 308 into an electrical or acoustic signal, and transmit (wirelessly or through a wire) the electrical or acoustic signal to the external location 310.

The external location 310 can be, for example and without limitation, a device on the surface of the wellbore and/or a device in the wellbore. The device can be, for example, a detector, a wireless device, a sensor device, a communication interface, a computing device, and/or any device capable of receiving data signals.

In some implementations, one or more light-emitting devices, such as LEDs or lasers, can be installed on, or integrated into, the drill pipe 108 to function as one or more transceivers on the optical waveguide (e.g., layers 204-208). For example, LEDs can be distributed throughout the drill pipe 108 at various locations on the waveguide (e.g., layers 204-208) and/or inner surface 202 of the drill pipe 108 to transmit light over the waveguide. In some cases, the LEDs or other light-emitting devices can be built into the drill pipe 108.

Moreover, in some examples, one or more electrically-modulated reflectors can be implemented at one or more locations on the inner surface 202 of the drill pipe 108 to modulate and reflect light signals. In some implementations, such reflectors can be implemented using materials that can modulate the intensity of light and/or control the transparency of light. For example, one or more reflective modulators can be implemented using material(s) capable of transitioning a light beam between transparent and opaque.

The number and positioning of the repeaters 302, 304, and 306 shown in FIG. 3 are merely illustrative examples provided for explanation purposes. One of ordinary skill in the art will recognize that, as previously noted, the number and/or placement of repeaters can vary in other implementations.

Figure 4:
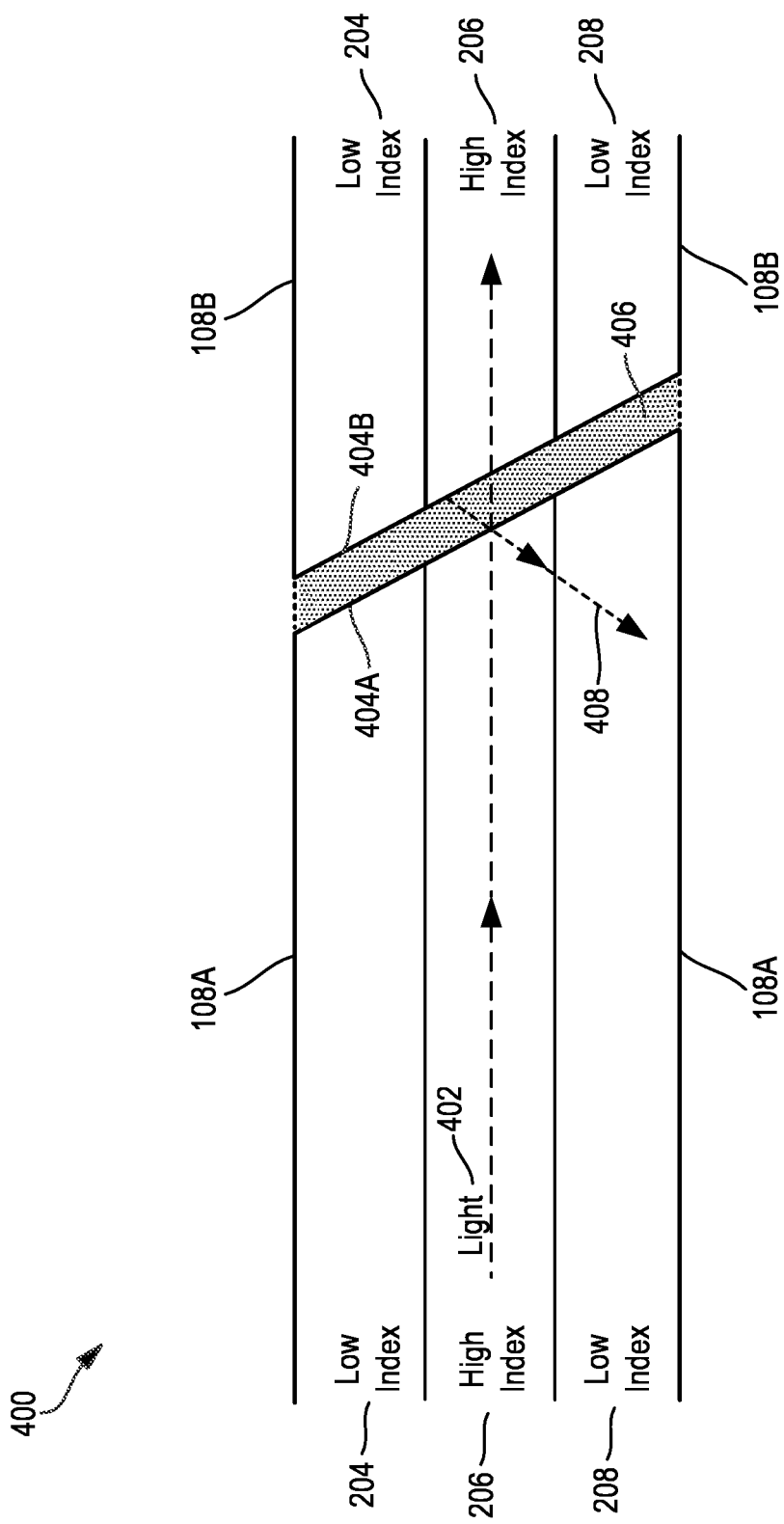
FIG. 4 is a diagram of an example configuration of an optical waveguide implemented across multiple coupled drill pipes, in accordance with some examples.

FIG. 4 illustrates an example configuration 400 of an optical waveguide (e.g., layers 204, 206, 208) implemented across two coupled drill pipes 108A-B. In this example, drill pipe 108A and drill pipe 108B are coupled together via coupling interfaces 404A-B. The coupling interfaces 404A-B can include a coupling mechanism such as a joint, for example. The coupling interfaces 404A-B can be coated with a jointing layer 406 designed to minimize optical transmission loss through the coupling interfaces 404A-B and the jointing layer 406.

In some cases, the jointing layer 406 can be an index-matching layer of a high refractory-index material. The high refractory-index material in the jointing layer 406 can improve coupling between the surfaces of the two drill pipes 108A-B and increase transmission probability. Moreover, in some implementations, the coupling surface (e.g., jointing layer 406) between the two drill pipes 108A-B can be shaped as a mating beveled surface to increase coupling between the drill pipes 108A-B.

To prevent light 402 propagated by the high index layer 206 from reflecting back within the high index layer 206 when the light 402 reaches the coupling interfaces 404A-B, which can cause interference and signal loss, the coupling interfaces 404A-B and jointing layer 406 can be configured in a particular angle so the coupling interfaces 404A-B are parallel (or substantially parallel) to each other. For example, the coupling interfaces 404A-B can be angled in parallel in a configuration similar to a parallelogram.

The particular, parallel angles of the coupling interfaces 404A-B can cause any light reflection 408 to have an angle of incidence (e.g., relative to the critical angle) that causes the light reflection 408 to be propagated into the low index layer 208. This can prevent back reflection into the high index layer 206, thus reducing or eliminating potential interference and loss due to such back reflection.

The light 402 that is not reflected into the low index layer 208 can travel through the high index layer 206 and the jointing layer 406 via total internal reflection. The light 402 can then continue to travel through the high index layer 206 in the second drill pipe 108B. If the second drill pipe 108B is coupled to another component, such as another drill pipe, the light 402 can travel through a similar coupling between them, which can have an index-matching surface layer as described herein, and continue to travel through a high index layer in the coupled component until it reaches its destination (e.g., a receiving device such as a detector).

While FIG. 4 shows two drill pipes coupled together and used as a continuous waveguide, it should be noted that this is merely one illustrative example provided for explanation purposes. One of ordinary skill in the art will recognize that the concepts described here can be used in other implementations having more than two coupled drill pipes, tools, and/or other components. For example, in other implementations, more than two drill pipes can be coupled and used as a waveguide as described herein.

Moreover, while the optical waveguide described in FIGS. 2A through 4 is shown implemented in a drill pipe, one of ordinary skill in the art will recognize that the optical waveguide and concepts herein can similarly be implemented on various other tools or components such as, for example and without limitation, a tubular or tubing or any other component suitable for implementing a sequence of low and high refractive-index layers to form a waveguide.

Figure 5:
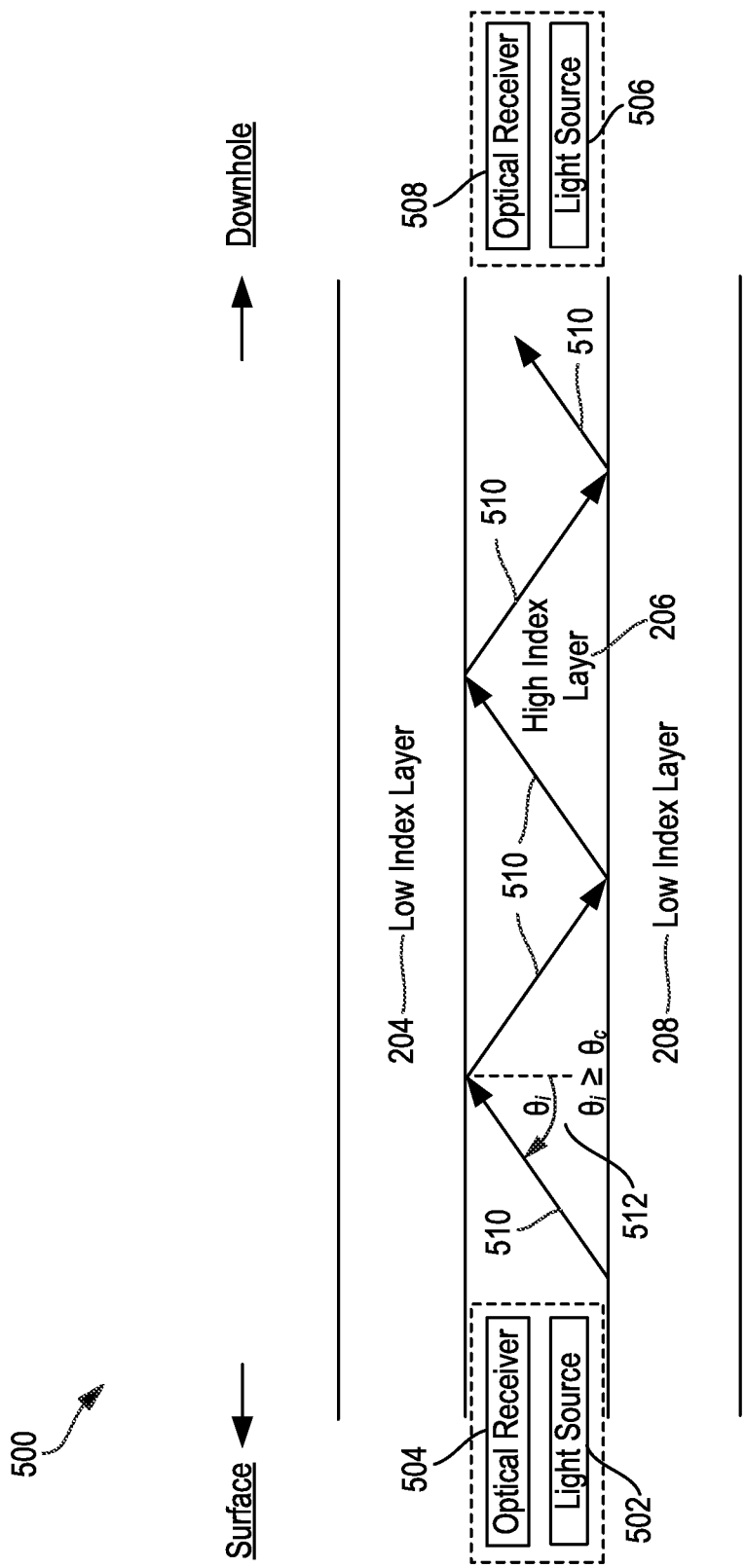
FIG. 5 is a diagram illustrating a light signal transmitted through an example configuration of an optical waveguide on an inner surface of a drill pipe, in accordance with some examples.

FIG. 5 is a diagram illustrating a light signal 510 transmitted through an example configuration 500 of an optical waveguide on an inner surface 202 of a drill pipe 108. In this example, the light signal 510 is transmitted from a light source 502 on a surface location and propagated through the optical waveguide to an optical receiver 508 downhole. However, in other examples, the waveguide can be used to send the light signal 510 to and from other locations. For example, in some cases, a light signal can be similarly transmitted from a light source 506 downhole to an optical receiver 504 on the surface. In other examples, different light signals can be separately communicated (simultaneously or otherwise) between devices on the surface and downhole through different channels or different waveguides on the drill pipe 108, as further described herein.

The light sources 502 and 506 can include any light-emitting devices. For example, the light sources 502 and 506 can be light bulbs, lasers, LEDs, lamps, and/or any other device capable of emitting light signals. In some implementations, the light source 506 for transmitting light signals from a downhole location can include a carbon dioxide laser. Carbon dioxide lasers operate at high temperatures and can produce enough power to transmit light signals to the surface.

Moreover, each of the optical receivers 504 and 508 can include a detector such as, for example and without limitation, a photomultiplier tube (PMT), a photodiode, an avalanche photodiode, a photodetector or light sensor and/or the like. The optical receivers 504 and 508 can receive light signals and read optical information in the light signals. The optical receivers 504 and 508 can convert the received light signals into electrical signals for use by electrical equipment such as computing devices, computer networks, etc. The optical receivers 504 and 508 can also include additional components such as one or more amplifiers (e.g., a low-noise amplifier, lock-in amplifier, etc.), processing devices (e.g., processor, microcontroller, etc.), sensors (e.g., image sensor, voltage sensor, current sensor, transducer, etc.), signal conditioning circuitry (e.g., filter, isolation circuit, linearization circuit, etc.), and so forth.

In some cases, the optical receivers 504 and 508 can improve a signal-to-noise ratio and/or can enhance a detection sensitivity using one or more methods such as, for example and without limitation, frequency selection (e.g., via notch or band filters), lock-in amplification (e.g., via a lock-in amplifier), isolation, etc. In some implementations, an optical receiver at or near the surface (e.g., optical receiver 504) can use isolation filters to isolate the detector from ambient light noise at or near the surface.

The optical waveguide used to carry the light signal 510 can include the layers 204-208 deposited on the inner surface 202 of the drill pipe 108, as previously explained. The light signal 510 can be carried in the high index layer 206 through total internal reflection. For example, the light source 502 at the surface location can couple a light signal 510 of a given wavelength to the high index layer 206. The high index layer 206 can carry the light signal 510 through total internal reflection.

Total internal reflection occurs when the incident angle 512 ($\theta_i$) for the light signal 510 is greater or equal to the critical angle $\theta_c$ (e.g., angle of incidence that results in a refracted ray). For example, as the light signal 510 traveling through the high index layer 206 towards the boundary with the low index layer 204, which has a lower refractive-index value than the high index layer 206, the light signal 510 is totally internally reflected when the angle of incidence in the high index layer 206 reaches a certain critical value.

The reflected light signal 510 continues to travel through the high index layer 206 towards the boundary with the low index layer 208, which also has a lower refractive-index value than the high index layer 206. The light signal 510 is again totally internally reflected when the angle of incidence in the high index layer 206 reaches a certain critical value. The light signal 510 can continue to travel in this manner within the high index layer 206 until it reaches the optical receiver 508.

The optical receiver 508 can receive the light signal 510 and extract optical information in the light signal 510. Moreover, in some examples, the optical receiver 508 can convert the light signal 510 into a format, such as an electrical signal, suitable for a computing device or network.

The light source 506 at the downhole location can similarly send light signals toward a surface location. For example, the light source 506 can generate a light signal and similarly propagate the light signal through the high index layer 206 to the optical receiver 504. In some implementations, the light sources 502 and 506 can use different frequencies of light for downhole communications and uphole communications to create different channels of communication.

For example, the light source 502 can use a specific frequency of light to transmit light signals (e.g., 510) to the optical receiver 508 at the downhole location, and the light source 506 at the downhole location can use a different frequency of light to transmit light signals to the optical receiver 504 at or near the surface location.

In some implementations, the wavelength of light signals transmitted from or near the surface can be selected to avoid significant interference from ambient light conditions (e.g., UV-VIS radiation). For example, the light source 502 at or near the surface can send light signals (e.g., 510) downhole having a wavelength at near or mid infrared radiation wavelength ranges to avoid inference with UV-A, UV-B, or UV-C light from the surface.

Having disclosed some example system components and concepts, the disclosure now turns to FIG. 6, which illustrates an example method 600 for implementing an optical waveguide to communicate information to and from a downhole location on a wellbore. The steps outlined herein are exemplary and can be implemented in any combination thereof, including combinations that exclude, add, or modify certain steps.

At step 602, the method 600 can include generating a light signal (e.g., 510) via a light-emitting device (e.g., light source 502 or 506) at a first location on a wellbore environment (e.g., 100). The first location on the wellbore environment can be, for example, a downhole location or a location at or near the surface of the wellbore (e.g., 116) in the wellbore environment. The light signal generated can carry information communicated through the light signal, such as measurements for example.

At step 604, the method 600 can include propagating the light signal through an optical waveguide on an inner surface (e.g., 202) of a wellbore tool (e.g., 108). For example, the light-emitting device can generate the light signal and transfer or couple it to the optical waveguide for propagation through the optical waveguide. The wellbore tool can include any tool or component capable of being coated with a sequence of low and high refractive-index layers to create an optical wellbore as described herein. For example, in some cases, the wellbore tool can include a drill pipe, a wellbore tubular, a production tubing, a drill string, etc.

In some implementations, the wellbore tool can include one or more repeaters or relays at one or more sections of the wellbore tool to amplify light signals propagated through the optical waveguide on the wellbore tool. In some cases, one or more of repeaters can carry light signals from an inner surface of the wellbore tool to an outer location (e.g., an external device) of the drill pipe. For example, an optical waveguide including a sequence of low and high index-refractive layers can be implemented to carry light signals between the inner surface of the drill pipe and an outer surface of the drill pipe. A repeater can be implemented on the inner surface of the wellbore tool and/or an outer surface of the wellbore tool to propagate light signals through the optical waveguide configured to carry light signals between the inner and outer surfaces.

Moreover, in some implementations, the wellbore tool can include one or more light sources and/or detectors at one or more sections of the wellbore tool. The light sources can generate new light signals for propagation through the optical waveguide or process light signals carried by the optical waveguide. The detectors can be used to detect light signals at one or more different locations on the wellbore tool.

In some cases, the wellbore tool can include multiple wellbore tools or components. For example, in some implementations, the wellbore tool can include multiple drill pipes jointed or coupled together. The multiple drill pipes can each include the optical waveguide to allow light signals to travel across the multiple drill pipes. The multiple drill pipes can also include a jointing layer (e.g., 406) of index-matching material to allow light signals from one drill pipe to travel across the jointing layer and to an optical waveguide on a connecting drill pipe with minimal signal loss (or none). The multiple drill pipes can be connected through a jointing or coupling interface (e.g., 404A-B) configured to avoid or reduce back reflection of light signals.

The optical waveguide can include a sequence of low and high refractive-index layers. In some aspects, the optical waveguide can include a first layer (e.g., low refractive-index layer 204) of low refractive-index material, a second layer (e.g., high refractive-index layer 206) of high refractive-index material applied to a surface of the first layer (e.g., coated over the first layer), and a third layer (e.g., low refractive-index layer 208) of low refractive-index material applied to a surface of the second layer (e.g., coated over the second layer).

In some implementations, the first layer can be coated over, or applied directly to, the inner surface of the wellbore tool. In other implementations, the first layer can be coated over, or applied to, a buffer layer (e.g., 222) that is first coated over, or applied directly to, the inner surface of the wellbore tool. Moreover, in some implementations, a protective layer (e.g., 224) can be coated over, or applied to, a surface of the third layer to protect the optical waveguide from damage such as scratches or abrasions. For example, the third layer can be coated with a protective layer or film of protective material. The protective material can be a scratch or abrasion resistant material such as, for example and without limitation, diamond, diamond-like carbon, sapphire, or any other suitable scratch resistant material.

In some cases, the first layer, the second layer, and/or the third layer on the inner surface of the wellbore tool can be deposited and/or chemically bonded using plasma-enhanced chemical vapor deposition or plasma-enhanced atomic layer deposition. Moreover, in some implementations, the low refractive-index material in the first and/or third layer can include silicon dioxide, sapphire crystal, fused silica, or any suitable low refractive-index dielectric oxide film, and the high refractive-index material can include silicon, germanium, gallium arsenide, or any high refractive-index semiconductor compound material.

At step 606, the method 600 can include receiving, by a detector (e.g., optical receiver 504 or 508) at a second location on the wellbore environment, the light signal via the optical waveguide on the inner surface of the wellbore tool. The second location on the wellbore environment is a different location than the first location of the light-emitting device in step 602. For example, if the first location of the light-emitting device is a downhole location, then the second location of the detector can be a location at or near the surface of the wellbore or a particular are along the wellbore. In another example, if the first location of the light-emitting device is a location at or near the surface of the wellbore or in a particular are along the wellbore, then the second location of the detector can be a downhole location or a different area along the wellbore.

In some implementations, the method 600 can also include generating a second light signal via a second light-emitting device (e.g., light source 502 or 506) at the second location on the wellbore environment; propagating the second light signal through the optical waveguide on the inner surface of the wellbore tool; and receiving, by a second detector (e.g., optical receiver 504 or 508) at the first location on the wellbore environment, the second light signal via the optical waveguide on the inner surface of the wellbore tool. In some examples, the first light signal and the second light signal can be propagated through the optical waveguide via different frequency or wavelength channels. Moreover, in some examples, the first light signal and the second light signal can be isolated using one or more filters such as, for example and without limitation, a narrow band filter or a bandpass filter.

In some aspects, the method 600 can include generating a second light signal via a second light-emitting device (e.g., light source 502 or 506) at the second location on the wellbore environment; propagating the second light signal through a second optical waveguide on the inner surface of the wellbore tool; and receiving, by a second detector (e.g., optical receiver 504 or 508) at the first location on the wellbore environment, the second light signal via the optical waveguide on the inner surface of the wellbore tool. For example, in some cases, multiple optical waveguides can be implemented or configured on the inner surface of the wellbore tool.

To illustrate, a second optical waveguide can be created by applying or coating a fourth layer of high refractive-index material over the third layer of low refractive-index material and applying or coating a fifth layer of low refractive-index material over the fourth layer. The fourth layer of high refractive-index material between the third and firth layers of low refractive-index material can carry light signals. Thus, the second and fourth layers of high refractive-index materials can carry different or separate light signals. In some cases, the second layer can be used for communications originating from one location (e.g., a location at or near the surface) and the fourth layer can be used for communications originating from a different location (e.g., a downhole location). This way, the second and fourth layers can provide bi-directional communication through separate channels. In other examples, the second and/or fourth layers can each be used to carry communications from to and/or from different locations.

Having disclosed example systems, methods, and technologies for generating a graph data model containing well construction activity and data, the disclosure now turns to FIG. 7, which illustrates an example computing device architecture 700 that can be employed to perform various steps, methods, and techniques disclosed herein. The various implementations will be apparent to those of ordinary skill in the art when practicing the present technology. Persons of ordinary skill in the art will also readily appreciate that other system implementations or examples are possible.

As noted above, FIG. 7 illustrates an example computing device architecture 700 of a computing device that can implement various technologies and techniques described herein. For example, the computing device architecture 700 can implement one or more computing devices described herein and perform various steps, methods, and techniques disclosed herein, such as one or more steps of the method 600 shown in FIG. 6.

The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device architecture 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicate that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statement 1: A method comprising generating a light signal via a light-emitting device at a first location on a wellbore environment; propagating the light signal through an optical waveguide on an inner surface of a wellbore tool, the optical waveguide comprising a first layer of low refractive-index material, a second layer of high refractive-index material applied to a first surface of the first layer, and a third layer of low refractive-index material applied to a second surface of the second layer; and receiving, by a detector at a second location on the wellbore environment, the light signal via the optical waveguide on the inner surface of the wellbore tool.

Statement 2: A method according to Statement 1, wherein the first location comprises a surface location and the second location comprises a downhole location.

Statement 3: A method according to any of Statements 1 and 2, wherein the first location comprises a downhole location and the second location comprises a surface location.

Statement 4: A method according to any of Statements 1 through 3, wherein the wellbore tool comprises at least one of a drill pipe, a wellbore tubular, and a production tubing, and wherein the optical waveguide further comprises a protective layer of scratch resisting material coating at least one of the inner surface of the wellbore tool and an outer surface of the third layer, the scratch resisting material comprising at least one of diamond, diamond-like carbon, and sapphire.

Statement 5: A method according to any of Statements 1 through 4, further comprising: generating a second light signal via a second light-emitting device at the second location on the wellbore environment; propagating the second light signal through the optical waveguide on the inner surface of the wellbore tool; and receiving, by a second detector at the first location on the wellbore environment, the second light signal via the optical waveguide on the inner surface of the wellbore tool.

Statement 6: A method according to any of Statements 1 through 5, wherein the first light signal and the second light signal are propagated through the optical waveguide via different frequency or wavelength channels and isolated using one or more filters, the one or more filters comprising at least one of a narrow band filter and a bandpass filter.

Statement 7: A method according to any of Statements 1 through 6, further comprising: generating a second light signal via a second light-emitting device at the second location on the wellbore environment; propagating the second light signal through a second optical waveguide on the inner surface of the wellbore tool; and receiving, by a second detector at the first location on the wellbore environment, the second light signal via the optical waveguide on the inner surface of the wellbore tool.

Statement 8: A method according to any of Statements 1 through 7, wherein the second optical waveguide comprises a fourth layer of high refractive-index material over the third layer of low refractive-index material and a fifth layer of low refractive-index material applied over the fourth layer.

Statement 9: A method according to any of Statements 1 through 8, wherein the first layer, the second layer, and the third layer on the inner surface of the wellbore tool are chemically bonded using one of chemical vapor deposition, plasma-enhanced chemical vapor deposition, thermal chemical vapor deposition, atomic layer deposition, thermal atomic layer deposition, or plasma-enhanced atomic layer deposition.

Statement 10: A method according to any of Statements 1 through 9, wherein the low refractive-index material comprises at least one of silicon dioxide, sapphire crystal, fused silica, and low refractive-index dielectric oxide film, and wherein the high refractive-index material comprises silicon, germanium, gallium arsenide, and a high refractive-index semiconductor compound material.

Statement 11: A system comprising: a wellbore tool; and an optical waveguide on an inner surface of the wellbore tool, the optical waveguide comprising a first layer of low refractive-index material on the inner surface of the wellbore tool, a second layer of high refractive-index material applied to a first surface of the first layer, and a third layer of low refractive-index material applied to a second surface of the second layer.

Statement 12: A system according to Statement 11, further comprising: a light-emitting device for propagating light signals through the optical waveguide; and a detector for receiving the light signals through the optical waveguide and extracting information in the light signals.

Statement 13: A system according to any of Statements 11 and 12, further comprising: a second light-emitting device for propagating light signals through the optical waveguide; and a second detector for receiving the light signals through the optical waveguide and extracting information in the light signals.

Statement 14: A system according to any of Statements 11 through 13, wherein the wellbore tool comprises at least one of a drill pipe in a wellbore environment, a tubular in the environment, and a production tubing in the environment, at least one of the light-emitting device and the second detector being located at one of a surface location or a downhole location, and at least one of the first detector and the second light-emitting device being located at a different one of the surface location and the downhole location.

Statement 15: A system according to any of Statements 11 through 14, wherein the light-emitting device and the second light-emitting device are configured to propagate light signals through the optical waveguide via different frequency or wavelength channels and isolate the light signals using one or more filters, the one or more filters comprising at least one of a narrow band filter and a bandpass filter.

Statement 16: A system according to any of Statements 11 through 15, further comprising a second optical waveguide on the inner surface of the wellbore tool, the second optical waveguide comprising a fourth layer of high refractive-index material over the third layer of low refractive-index material and a fifth layer of low refractive-index material applied over the fourth layer.

Statement 17: A system according to any of Statements 11 through 16, wherein the optical waveguide further comprises a protective layer of scratch resisting material coating at least one of the inner surface of the wellbore tool and an outer surface of the third layer, the scratch resisting material comprising at least one of diamond, diamond-like carbon, and sapphire.

Statement 18: A system according to any of Statements 11 through 17, wherein the first layer, the second layer, and the third layer on the inner surface of the wellbore tool are chemically bonded using one of chemical vapor deposition, plasma-enhanced chemical vapor deposition, thermal chemical vapor deposition, atomic layer deposition, thermal atomic layer deposition, or plasma-enhanced atomic layer deposition.

Statement 19: A system according to any of Statements 11 through 18, wherein the low refractive-index material comprises at least one of silicon dioxide, sapphire crystal, fused silica, and low refractive-index dielectric oxide film, and wherein the high refractive-index material comprises silicon, germanium, gallium arsenide, and a high refractive-index semiconductor compound material.

Statement 20: A system according to any of Statements 11 through 19, wherein the detector comprises at least one of a photomultiplier tube, an avalanche photodiode, a photodiode, and a light sensor, and wherein the light-emitting device comprises at least one of a light-emitting diode, a laser, and a light bulb.

Statement 21: A system comprising means for performing a method according to any of Statements 1 through 10.

Statement 22: At least one non-transitory computer-readable storage medium having stored thereon instructions which, when executed by one or more processing devices, cause the one or more processing devices to perform a method according to any of Statements 1 through 10.

What is claimed is:

1. A method comprising:
generating a light signal having a predetermined wavelength via a light-emitting device at a first location on a wellbore environment;
propagating the light signal through an optical waveguide on an inner surface of a wellbore tool, the optical waveguide comprising a first layer of low refractive-index material, a second layer of high refractive-index material applied to a first surface of the first layer, and a third layer of low refractive-index material applied to a second surface of the second layer; and
receiving, by a detector at a second location on the wellbore environment, the light signal via the optical waveguide on the inner surface of the wellbore tool.

2. The method of claim 1, wherein the first location comprises one of a surface location and a downhole location, and wherein the second location comprises a different one of the surface location and the downhole location.

3. The method of claim 1, wherein the wellbore tool comprises at least one of a drill pipe, a wellbore tubular, and a production tubing, and wherein the optical waveguide further comprises a protective layer of scratch resisting material coating at least one of the inner surface of the wellbore tool and an outer surface of the third layer, the scratch resisting material comprising at least one of diamond, diamond-like carbon, and sapphire.

4. The method of claim 1, wherein the low refractive-index material comprises silicon dioxide, sapphire crystal, fused silica, or a low refractive-index dielectric oxide film, and wherein the high refractive-index material comprises silicon, germanium, gallium arsenide, or a high refractive-index semiconductor compound material.

5. The method of claim 1, further comprising:
generating a second light signal via a second light-emitting device at the second location on the wellbore environment;
propagating the second light signal through the optical waveguide on the inner surface of the wellbore tool; and
receiving, by a second detector at the first location on the wellbore environment, the second light signal via the optical waveguide on the inner surface of the wellbore tool.

6. The method of claim 5, wherein the light signal and the second light signal are propagated through the optical waveguide via different frequency or wavelength channels and isolated using one or more filters, the one or more filters comprising at least one of a narrow band filter and a bandpass filter.

7. The method of claim 1, further comprising:
generating a second light signal via a second light-emitting device at the second location on the wellbore environment;
propagating the second light signal through a second optical waveguide on the inner surface of the wellbore tool; and
receiving, by a second detector at the first location on the wellbore environment, the second light signal via the optical waveguide on the inner surface of the wellbore tool.

8. The method of claim 7, wherein the second optical waveguide comprises a fourth layer of high refractive-index material over the third layer of low refractive-index material and a fifth layer of low refractive-index material applied over the fourth layer.

9. The method of claim 1, wherein the first layer, the second layer, and the third layer on the inner surface of the wellbore tool are chemically bonded using one of chemical vapor deposition or atomic layer deposition.

10. The method of claim 9, wherein the chemical vapor deposition comprises one of plasma-enhanced chemical vapor deposition or thermal chemical vapor deposition, and wherein the atomic layer deposition comprises one of plasma-enhanced atomic layer deposition or thermal atomic layer deposition.

11. A system comprising:
a wellbore tool;
an optical waveguide on an inner surface of the wellbore tool, the optical waveguide comprising a first layer of low refractive-index material on the inner surface of the wellbore tool, a second layer of high refractive-index material applied to a first surface of the first layer, and a third layer of low refractive-index material applied to a second surface of the second layer; and a light-emitting device for propagating light signals having a predetermined wavelength through the optical waveguide.

12. The system of claim 11, further comprising a second optical waveguide on the inner surface of the wellbore tool, the second optical waveguide comprising a fourth layer of high refractive-index material over the third layer of low refractive-index material and a fifth layer of low refractive-index material applied over the fourth layer.

13. The system of claim 11, wherein the optical waveguide further comprises a protective layer of scratch resisting material coating at least one of the inner surface of the wellbore tool and an outer surface of the third layer, the scratch resisting material comprising at least one of diamond, diamond-like carbon, and sapphire.

14. The system of claim 11, wherein the first layer, the second layer, and the third layer on the inner surface of the wellbore tool are chemically bonded using one of chemical vapor deposition, plasma-enhanced chemical vapor deposition, thermal chemical vapor deposition, atomic layer deposition, thermal atomic layer deposition, or plasma-enhanced atomic layer deposition.

15. The system of claim 11, wherein the low refractive-index material comprises silicon dioxide, sapphire crystal, fused silica, or a low refractive-index dielectric oxide film, and wherein the high refractive-index material comprises silicon, germanium, gallium arsenide, or a high refractive-index semiconductor compound material.

16. The system of claim 11, further comprising:
a detector for receiving the light signals through the optical waveguide and extracting information in the light signals.

17. The system of claim 16, wherein the detector comprises at least one of a photomultiplier tube, an avalanche photodiode, a photodiode, and a light sensor, and wherein the light-emitting device comprises at least one of a light-emitting diode, a laser, and a light bulb.

18. The system of claim 16, further comprising:
a second light-emitting device for propagating light signals through the optical waveguide; and
a second detector for receiving the light signals through the optical waveguide and extracting information in the light signals.

19. The system of claim 18, wherein the wellbore tool comprises at least one of a drill pipe in a wellbore environment, a tubular in the environment, and a production tubing in the environment, at least one of the light-emitting device and the second detector being located at one of a surface location or a downhole location, and at least one of the first detector and the second light-emitting device being located at a different one of the surface location and the downhole location.

20. The system of claim 18, wherein the light-emitting device and the second light-emitting device are configured to propagate light signals through the optical waveguide via different frequency or wavelength channels and isolate the light signals using one or more filters, the one or more filters comprising at least one of a narrow band filter and a bandpass filter.

* * * * *